United States Patent
Serrano Olmedo et al.

(10) Patent No.: US 9,733,334 B2
(45) Date of Patent: Aug. 15, 2017

(54) SYSTEM AND METHOD FOR LOCATING OBJECTS USING RADIO FREQUENCY IDENTIFIERS

(71) Applicants: TARANTO ESTUDIOS E INVERSIONES, S.L., Madrid (ES); Jose Javier Serrano Olmedo, San Sebastian de los Reyes, Madrid (ES)

(72) Inventors: Jose Javier Serrano Olmedo, Madrid (ES); Jorge Crespo Romero, Madrid (ES)

(73) Assignees: TARANTO ESTUDIOS E INVERSIONES, S.L., Madrid (ES); Jose Javier Serrano Olmedo, Madrid (ES)

( * ) Notice: Subject to any disclaimer, the term of this patent is extended or adjusted under 35 U.S.C. 154(b) by 366 days.

(21) Appl. No.: 14/397,804

(22) PCT Filed: May 10, 2013

(86) PCT No.: PCT/EP2013/059719
§ 371 (c)(1),
(2) Date: Oct. 29, 2014

(87) PCT Pub. No.: WO2013/167729
PCT Pub. Date: Nov. 14, 2013

(65) Prior Publication Data
US 2015/0116144 A1 Apr. 30, 2015

(30) Foreign Application Priority Data
May 11, 2012 (ES) .................................. 201230711

(51) Int. Cl.
*G01S 3/02* (2006.01)
*G01S 5/02* (2010.01)
(Continued)

(52) U.S. Cl.
CPC .............. *G01S 5/02* (2013.01); *G01S 5/0009* (2013.01); *G01S 11/06* (2013.01)

(58) Field of Classification Search
CPC ...................................... G01S 5/14; G01S 5/30
(Continued)

(56) References Cited

U.S. PATENT DOCUMENTS 6,127,917 A 10/2000 Tuttle
2005/0140544 A1 6/2005 Hamel et al.
(Continued)

FOREIGN PATENT DOCUMENTS

ES 2324085 B1 7/2009
KR 2010 0068850 A 6/2010
(Continued)

*Primary Examiner* — Dao Phan
(74) *Attorney, Agent, or Firm* — Lucas & Mercanti, LLP

(57) ABSTRACT

A system and method for locating objects using radio frequency identifiers is provided. Each object to be located by the user has an object unit attached thereto with a RFID transponder. The user carries a proximity unit with a RFID transponder and warning devices. The method comprises: -a controller receives the instruction to locate a specific object; the controller obtains RFID readings, from the main intermediate units associated with location areas, with information about the object units detected; -determining the location area of the object to be located; -sending information to the user about the location area; -detecting the presence of the proximity unit carried by the user when it is within the location area; -repeatedly obtaining, using readings of the RFID signal strength, information about the distance between the proximity unit and the object unit, reporting it to the user using warning devices.

14 Claims, 9 Drawing Sheets

(51) Int. Cl.
*G01S 5/00* (2006.01)
*G01S 11/06* (2006.01)

(58) Field of Classification Search
USPC .............. 342/351, 458, 463–465; 455/456.2, 455/456.3
See application file for complete search history.

(56) References Cited

U.S. PATENT DOCUMENTS

| | | |
|---|---|---|
| 2005/0270158 A1 | 12/2005 | Corbett, Jr. |
| 2006/0190538 A1 | 8/2006 | Hwang et al. |
| 2006/0208925 A1 | 9/2006 | Wassingbo |
| 2007/0013541 A1 | 1/2007 | Harazin et al. |
| 2009/0167495 A1 | 7/2009 | Smith et al. |

FOREIGN PATENT DOCUMENTS

| | | |
|---|---|---|
| WO | WO 2004/059598 A1 | 7/2004 |
| WO | WO 2005/071597 A1 | 8/2005 |
| WO | WO 2006/045819 A2 | 5/2006 |
| WO | WO 2006/065430 A1 | 6/2006 |
| WO | WO 2007/072389 A1 | 6/2007 |
| WO | WO 2010/056287 A1 | 5/2010 |

SYSTEM AND METHOD FOR LOCATING OBJECTS USING RADIO FREQUENCY IDENTIFIERS

CROSS REFERENCE TO RELATED APPLICATION

This Application is a 371 of PCT/EP2013/059719 filed on May 10, 2013 which, in turn, claimed the priority of Spanish Patent Application No. P201230711 filed on May 11, 2012, both applications are incorporated herein by reference.

FIELD OF THE INVENTION

The present invention describes a system for the spatial localization of objects by means of sound, light or vibratory means; using radio frequency identification technology, as well as other communications technologies for short-range communication, i.e. for domestic settings or indoors. It relates to the technical sector of telecommunications, more specifically to Telecare services. Its use is particularly intended for people with a partial or total visual impairment, or a mild cognitive disorder. It is applicable to improve the quality of life of persons with or without partial or total visual impairments at their home. It can also serve as a tool to help locating singular objects surrounded by objects exhibiting similar characteristics, and which are sought after by non-expert users in the manipulation of said objects. Finally, in some implementations, the users themselves can also be located by the system, and they are even capable of receiving simple warnings.

BACKGROUND OF THE INVENTION

The loss of objects of common use is a daily problem in houses, care homes, etc. . . . If we add to this that one or all persons living in that house have a partial or total visual impairment, the problem is magnified. Moreover, some objects can be of non-easy localization in scenarios other than the domestic, like in emergency situation scenarios or in retailing when the presence of many objects and users not specially prepared to locate a specific item must be guided to find them out in a very efficient way. Based on the above, often, is necessary to locate objects in a controlled environment, where it is known with certainty that the object is in the surroundings but not with total accuracy or, oppositely, to assure that the search object is not present. Therefore, the ability to locate objects is limited by the distribution, size and mobility of the furniture, as well as the availability of devices easily attachable to any object regardless of its size.

Among the related publications of the state of the art, document US 20070013541 must be mentioned, which discloses an inventory system applied in a laboratory. Each object to be inventoried bears a RFID tag that is registered by readers fixed in the cupboards, storing the information in a database.

Document US 20090167495 describes a method for adapting RFID tags for its use in the localization and status indication of objects placed on shelves.

The system described in document WO 2010056287 provides one possible solution to the monitoring of patient samples in a hospital using RFID technology. RFID transponders attached to the samples store data associated with the patient from whom they were taken.

The system of document US 20050270158 discloses a possible solution for those cases in which the aim is to track both people and moving objects that pass through specific and fixed areas.

The US 20060190538 proposal consists in labeling the different devices of a house with RFID tags that allow knowing their location in a dynamic manner. This information is gathered in a central server where there is a record of the locations in real time.

The US 20060208925 system is based on transmitting information on the position received by means of a GPS system. The transmission of said information is carried out via a RFID link to the nearby locations.

WO 2006045819 describes a beaconing system using RFID tags on sidewalks that store spatial information already known due to the existence of a database.

The system described in WO 2005071597 also uses beaconing through RFID tags, but making a mesh on the ground. These tags can also store information about nearby objects or of special interest.

Document WO 2007072389 describes an indoor guiding method where RFID tags are also used as beacons that store spatial information about nearby objects.

Document ES 2324085B1 describes an object locating and tracking system where the RFID reader is integrated into a phone or mobile device carried by the user. As it moves through the area, it gathers information from nearby objects, which is stored in a database. Therefore, to detect an object it is necessary that the user has moved around its immediate surroundings in the past and the database may become obsolete if someone else changes the location of an object.

An outdoor navigation system for the visually impaired is described in document WO 2006065430, wherein thanks to sensors carried by the person in the walking cane and ankles the person is guided. Path mapping is carried out through GPS technology, and the system further integrates information received from the Internet.

A similar system is described in US 20050140544, where the tracking is carried out using GPS information and information received from the Internet wirelessly.

Document WO 2004059598 describes a method of audio description whereby a person carrying an RFID reader in their hand reads information from nearby tags, which is acoustically transferred to the user.

Document KR20100068850-A discloses a device and a method for locating an object to which an RFID tag has been added, using a portable terminal with an RFID reader, which interrogates the RFID tag and performs measurements of the strength of the response radio-frequency signal of the RFID tag, calculating based on said strength, the distance from the portable terminal to the object and displaying the result on a screen. However, unlike the present invention, the invention disclosed in said document does not allow an accurate and fast location, since the user does not know from where to start looking for the object, so that if the area is very large, the user may need to explore all the rooms of the area until detecting the response from the RFID tag (the response range of RFID tags is very small).

The problem posed by the art, therefore, is to achieve a system for the spatial location of objects allowing a fast and accurate Telecare services for people with or without partial or total visual disabilities in a more efficient way, in order to offer a better quality of life and independence at home.

DESCRIPTION OF THE INVENTION

The present invention details a system capable of detecting various objects within an enclosed area, by coupling devices containing RFID tags, to the objects to be located, and distributing different readers in the area to ensure the capacity of detecting objects. If in addition the number of RFID readers is 1 to 5 detectors per 10 m², it is possible to know the location of an object with a typical accuracy ranging between 15 and 25 cm. Using other RFID units that serve as beacons, similar to those coupled to the object but fixed in space, it is possible to achieve a better accuracy. The accuracy of the location, however, improves as the number of readers and beacon units increases.

In the present invention, an element comprising an RFID transponder can transfer to the user through a series of touch, sound and light interactions the orders regarding the movement necessary to find said objects in a controlled environment. It is also possible that no orders of movement whatsoever are transferred; instead, there is only a sensory signaling, which the user or another person can perceive as an indication of the location of the sought object.

In comparison with traditional identification methods, such as barcodes, RFID technology has the advantage that the identification is performed remotely, that is, without physical contact. A device called RFID reader performs a power emission through an attached antenna. Tags or RFID transponders act by reflecting said power to the reader returning only their reference number, in the simpler implementations, which is recorded by the reader itself.

In the present invention, the location of the object may be carried out by two not mutually exclusive procedures but possibly, though not necessarily, complementary: mode a) by comparison of the powers received from the unit coupled to the object by other auxiliary units which act as beacons, the location of which must be known by the detection system and; mode b) by direct sensory signals (light and/or sound) from the attached unit itself, or from auxiliary units, in which case their position may or may not be known by the system. Whereas the so-called main intermediate units are located in a fixed location, the so-called peripheral intermediate units can be located anywhere in the enclosed area where system is implemented. Its spatial situation may vary without knowledge of the system in mode b) and it cannot vary in mode a).

In mode a) or with power detection, from the power readings of all RFID readers, the location the desired object by some known method (for example by triangulation) is achieved. Once the system knows the locations of both the object and the user, the unit called controller or control, to shorten it, calculates the distance between them on the basis of the power received from both and sends the information periodically to the so-called unity of proximity, carried by the user. The information signaling in the form of warnings can be performed privately for the user, that is, the warnings are received and perceived only by the user. This concept is important in cases where the user is sharing the place with other people, maintaining their privacy and independence.

In mode b), or whenever there is no need for power detection or providing information to the system about the locations of the auxiliary peripheral units, these units emit a light and/or sound signal, according to the object search initiated by the user and the response of the unit coupled to the object itself. In this mode of use, it is advisable that auxiliary peripheral units are sufficiently spaced apart from each other so only one of them receives both the search signal initiated by the user and the response. In this mode, therefore, the cycle of communication between user and object by means of signals transmitted by the system is not closed as it is usual, but the signals reporting the location are sensory (light, sound).

Among the characteristics of the present invention, the capacity of the system for locating objects in a closed environment is highlighted, but at the same time, its versatility allows the location of the user. Although in the situation that has been described it has only been taken into account the existence of one user, it is possible the existence of more than one unit of proximity, allowing in this way the use of the system by more than one user. Additionally, the user's warning system can be performed in such a way that the warnings are only perceived by the user allowing a greater degree of independence for the user than if the system was not in operation, and avoiding any possible inconvenience that it might cause to other people that are in their environment. Another of the advantages of the present invention in comparison with already existing systems, is its low cost compared to other solutions, in which a multitude of RFID readers are used, can be explained by the fact that fewer RFID readers are needed, since they operate within a greater range with a frequency range of 2.45 GHZ and it is not necessary for the RFID tags to reach the proximity unit because, instead they can reach the auxiliary units. To the advantages of the use of this frequency range, it can be added the decrease in the size of the RFID tags since traditionally the largest element of an RFID tag, its antenna, has very small dimensions compared to the other existing systems where the use of a lower working frequency implies a larger antenna. Thus, the inclusion, coupling or integration of the tag into objects that are required to be controlled involves a minor difficulty due to its small size.

BRIEF DESCRIPTION OF THE DRAWINGS

Next, for a better understanding of the invention, a series of drawings will be described very briefly. Said drawings are expressly related to an embodiment of said invention, which arises as a non-limiting example thereof.

DETAILED DESCRIPTION OF THE INVENTION

The present invention is a system for the spatial location of objects, especially, although not necessarily, if they are small, by means of radio frequency in an environment that must be known to the system, up to some degree, according to the mode of use. It can also enable the location of the user in some embodiments. It comprises up to four types of elements: controller 1, intermediate unit, of two types (2, 2'), proximity unit 3 and object unit 4.

Figure 2:
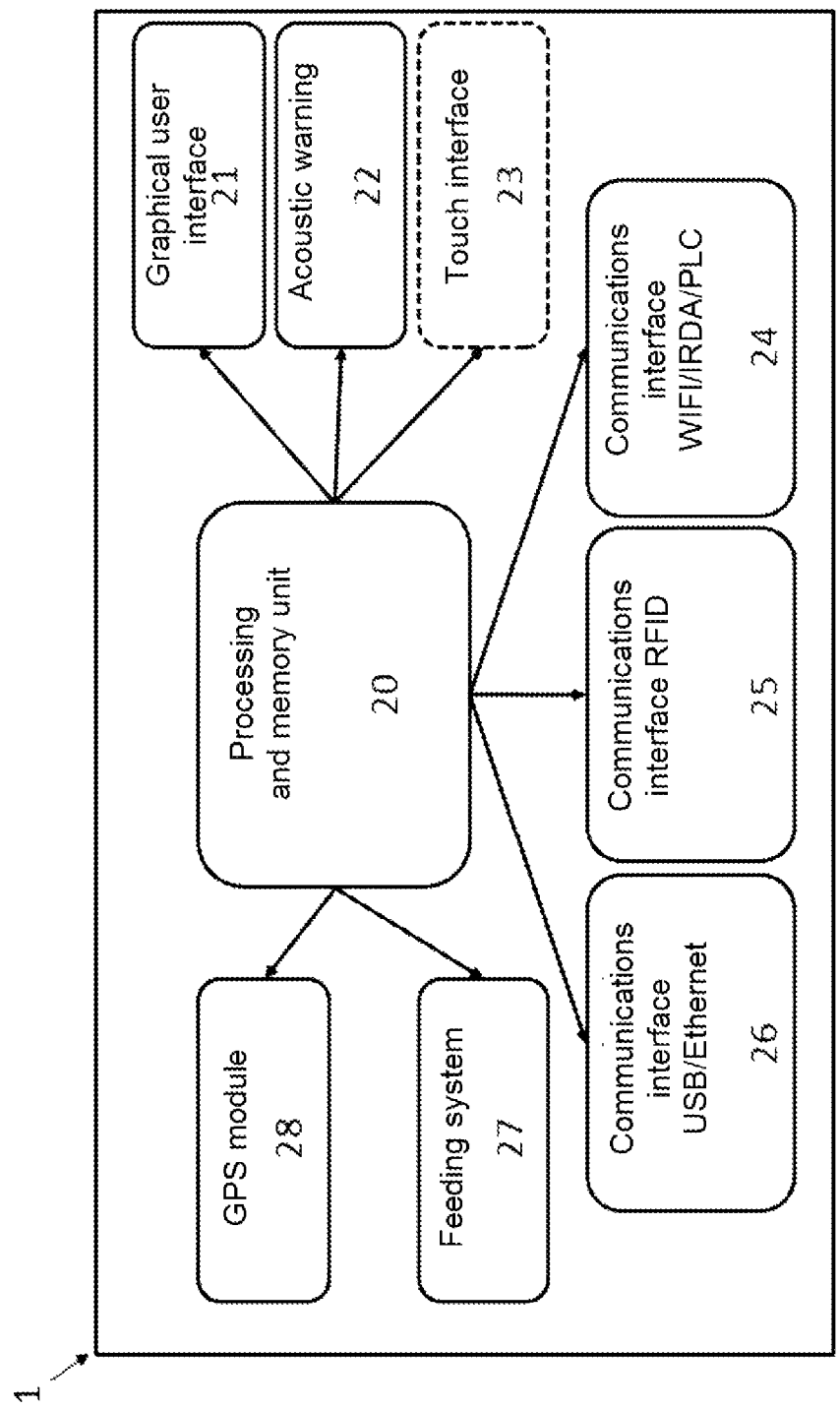
FIG. 2: Block diagram of the controller unit.

Ideally, the controller or controller unit 1, as shown in a possible but non limiting configuration in FIG. 2, has a fixed location and its function is to establish communication with the intermediate units (2, 2') and with the proximity unit, where appropriate, using communication technologies different from that used for the identification via radio frequency. Eventually it could also communicate with object units adopting functions of intermediate unit (2, 2'). The functions of the controller, without limitation, would be:
- configuration of the system: recording the number, type and physical position of the main and auxiliary intermediate units, where appropriate according to the mode of signaling the position of the objects, as well as its behavior mode (sensory-type signaling, waiting times, transmission power, etc.).
- establishment of the mode said units will use the communications (sensory signaling or positioning from the received power), as well as the channel and other properties that configure communications with them.
- configuration of the object units.
- calculation, when possible, the positions of the object and the user in the case of mode a) and reporting to the proximity unit the movements to be carried out to reach the vicinity of the object.
- Other uses such as registration and storage of search events, interaction with other systems for sharing information about the configuration or the reported events, etc.

The controller may be constituted by an autonomous equipment or it may be part of another equipment with enough intelligence, such as a PC or a smart phone, such that in this case the indicated functions are performed by a program and communications are channeled by one or more standardized peripherals, for instance, and without limitation for other possible peripherals: WIFI, PLC, IR. It will have a USB and/or Ethernet channel to facilitate communication with standard computer systems to enable remote configuration, location event logs exchange, etc.

The controller unit 1 can be powered with batteries, directly by the mains or by some environmental energy capturing method (light, radio frequency, sound, etc.), without limitation on the choice of the method, either alternatively or exclusively.

The intermediate unit can be of two types: main 2 or peripheral 2'. The main intermediate unit 2 is responsible of managing the communication for the location of the object and the proximity units. The peripheral intermediate unit 2' is a support unit for the spatial location of both, the object unit and the proximity unit and is not necessary in all applications, whereas the main is necessary. Both types of intermediate unit are distributed in the desired coverage area. In particular, the main peripheral units are assigned to relatively large rooms or areas, as compared to the size of the areas that the system is able to delimit as a container of the objects sought. The main intermediate units have the function of initiating radio frequency identification communications intended to reach the object units, with proximity units and, where appropriate, with intermediate peripheral units when they have no other alternative communications channels, in order to initiate the process of identification and spatial location of object and user. This function is not incompatible with the function of the peripheral intermediate units, they may also incorporate those functions depending on whether the radio frequency of the response of the sought object unit reaches the main intermediate units or not. If it reaches them, the main intermediate units will also act as peripheral intermediate units indicating the position of the object unit or the proximity unit, where appropriate. The main intermediate units must also have a communication channel other than the one used for identification by radio frequency in order to communicate with the controller unit (PLC, WIFI, IR, without limitation of others). Relevant configuration data, as well as information about the object unit to be identified, are received from the controller unit.

The main intermediate unit may be powered with batteries, directly by the mains or by some environmental energy capturing method (light, radio frequency, sound, etc.), without limitation on the choice of the method, either alternatively or exclusively.

The peripheral intermediate units do not initiate communication in any case, but they can receive the signals emitted by the object unit, by the proximity unit and the search signals emitted by the main intermediate units. These signals are processed to close the location cycle of the object unit or of the proximity unit sought, reporting its location. There are two modes of signaling this location.

In mode a), the peripheral intermediate units determine the power received from the object or proximity unit and inform the controller unit. This unit will process the data received from one or several peripheral intermediate units to determine the necessary movements to be performed by the proximity unit to approach effectively the object unit. The controller unit shall inform the proximity unit, directly if it has a communication channel with sufficient range (WIFI, IRDA) or through the main intermediate units that will retransmit the information through the RFID channel to the proximity unit, so that this, in turn, informs the user carrying it. To this end, it is necessary that the peripheral intermediate unit 2' has one or several of the following communication channels 46, without limitation: WIFI, IRDA, PLC, USB, Ethernet or the like. Through any of these channels, it will communicate with the controller unit to send the power information received. Similarly, one or more of these channels may be used so that the peripheral intermediate unit receives the relevant configuration for defining its functioning in a particular installed system.

In mode b), the peripheral intermediate unit is not able, or does not need to measure the received power since it does not have communication channels other than the radio frequency identification channel. In this case, the signaling must be strictly sensory, using light or acoustic signals. Therefore, it is the user that initiated the search, or another person who can communicate with the user by other means outside the system defined in this invention, who receives these signals. That person is thus informed about the spatial point, the place where the signaling intermediate unit is, in the whereabouts of the object unit. In this mode, the user does not need to carry any proximity unit, and in this case, the user is not locatable by the system.

The peripheral intermediate unit, both whether it has capacity to act according to mode a) (which may include b), or not, (which may be disabled or not in the first case) or only according to mode b), can be powered with batteries, directly by the mains or by some environmental energy capturing method (light, radio frequency, sound, etc.) without limitation on the choice of the method, either alternatively or exclusively.

The object unit 4 is integrated, attached or in proximity with the object to be sought to facilitate its location. Its communication is direct with the intermediate units, main 2 or peripheral 2', and contains identification information to be retransmitted to the controller in mode a) from the peripheral intermediate units or simply to these if it acts according to mode b). This information is used in the controller unit for generating location event logs, together with the information about the spatial positioning or location supplied by the peripheral units in mode a), and for being sent to the proximity unit, in the case that it allows it, and thus configuring the system. In a complementary way, the object unit can establish communication, according to some RFID standard, with the proximity unit so this unit can obtain this identification information directly from the object unit, as well as, inform the user carrying it that the communication has been established, which determines that the sought object is within the volume of the radio frequency signal range of the proximity unit.

The proximity unit 3 can physically match the controller unit when it is portable (a smart phone, or other devices with similar characteristics). The proximity unit informs the user that carries it, about the movements they must perform to approach the object unit, using sensory signals: light, sound or touch. The configuration information comes from the controller unit, if it is an object other than this, through a communications channel 56 which is necessarily wireless (RFID, WIFI, IR, or the like, without limitation) to enable portability. It may be the origin of the search, collecting the information that identifies the object sought by any standard, graphic, sound, or touch user interface, sending it to the controller unit. It can establish communication, or not, with the main or peripheral intermediate units to facilitate the spatial location of the user carrying it, in the physical environment where the system is displayed. Additionally, the proximity unit could estimate the distance from the object unit according to the power that is received in the communication by radio frequency.

In mode b) the proximity unit 3, however, is not an essential unit, as the search may originate in the controller unit and the location signal may be sensory, so the users do not have to carry any kind of unit but instead they only have to be able to perceive said signals.

The functions of each unit do not limit the functions of other units, nor are they fully obligatory, rather it is possible to select functions according to the versions of the system implemented, based on the present invention. That is, according to the absence of the necessary material resources or because they have been disabled by setting certain functions, determines the efficiency, or inefficiency of the implementation and the operation of each particular system implemented by the present invention. Therefore, there is a plurality of possible implementations depending on whether the functions mentioned for each type of unit can be executed or not.

Figure 1:
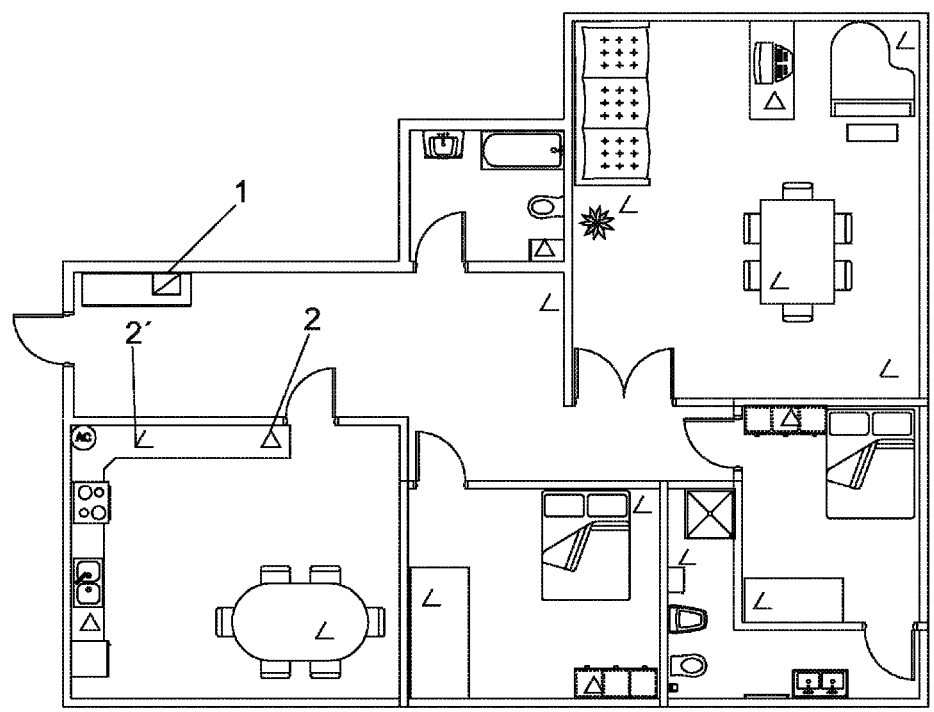
FIG. 1: Example of integration of the intermediate units and the controller in a domestic environment.

FIG. 1, an example of integration of the intermediate units (2, 2') and the controller 1 in a domestic environment, corresponds to a home with a surface equal to 98 m². The home comprises a hall, a living room, two bedrooms, two bathrooms and a kitchen. The controller unit 1 is located near the exit door, while the main 2 and the peripheral 2' units are located throughout the home environment. This example of implementation shows six main units 2 and eleven peripheral units 2'.

As shown in the diagram of FIG. 2, which represents a basic block diagram of the controller unit 1, it comprises, in a preferred embodiment, a touch screen 21 to avoid the use of keyboards and, a loudspeaker for acoustic warnings 22. It can optionally include a touch interface 23 to facilitate its interaction with blind people. Likewise, it comprises a processing and a memory unit 20, a feeding system 27 preferably based on its connection to the power network, but not exclusively in the case of portable controller units powered by batteries, communications interfaces 24 with the intermediate units and the proximity unit—e.g., 802.11 a/b/g/n (Wi-Fi), IEEE 802.15.1.x (Bluetooth), IrDA (Infrared Data Association) or PLC (Power Line Communication)—the communication interface with the object units based on some radio frequency identification standard (RFID) 25 and 26, for example based on USB (Universal Serial Bus interface) or Ethernet communication standards, for communications with different systems, with which it is possible to exchange all sorts of information, including remote configuration and real-time remote control. In addition, at least several, but not necessarily all, communication channels with intermediate units and proximity unit are needed. Interfaces with units with other systems are not essential. The RFID communication system is essential.

Through the controller, the user selects the object to be sought, configures the system and interacts with the information systems external to the one described in this invention.

In the present invention, by main intermediate unit 2 it is meant, the element of the system whose function is to initiate the establishment of communications in order to read the nearby object units using RFID technology, after receiving the indication from the controller of the object to be sought. The reading may occur or not depending on the range of the antenna of the object unit, being very likely that it does not occur. The purpose, essentially, is that the object unit attempts to reply by reflecting the radio frequency power received and, therefore, performing an emission from its specific spatial location, and, perhaps, depending on the modules with which is provided, also produce some kind of light or sound-signals.

Figure 3:
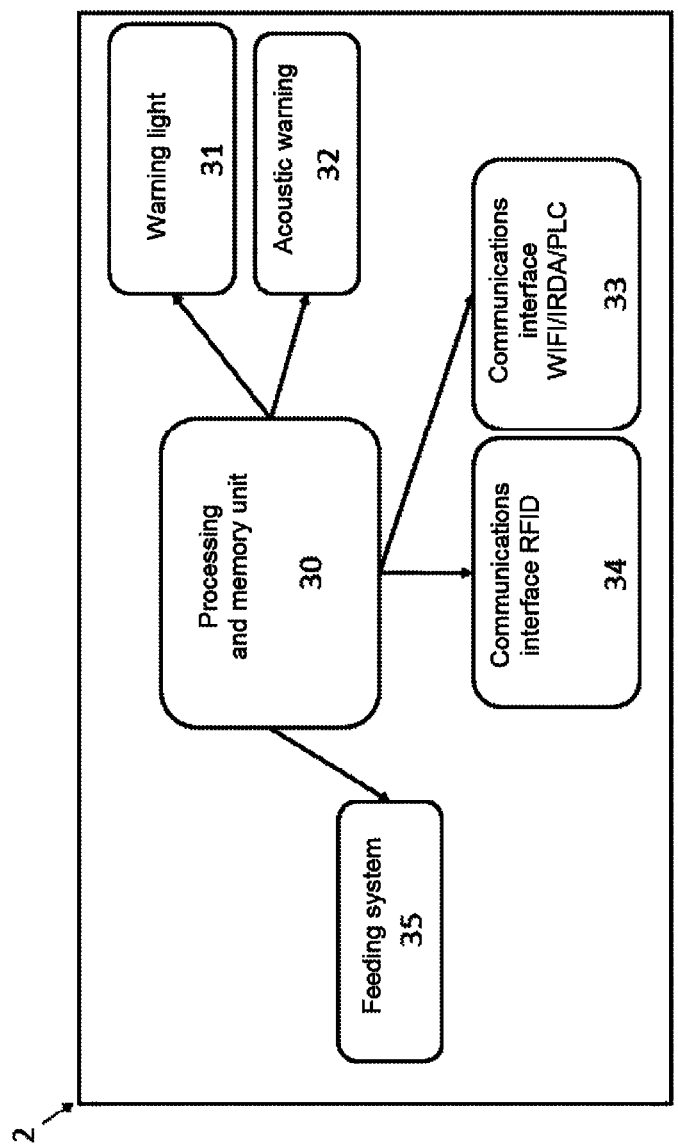
FIG. 3: Block diagram of the main intermediate unit.

The main intermediate units 2 are connected to the mains in a preferred implementation, without limitation of other types of power supply, so they have the ability to emit radio frequency with a high power to ensure large range interaction with the object or intermediate units, up to tens of meters, using a RFID interface 34. They may or may not have devices capable of performing light 31 or sound 32 warnings. Each of them has a processing and memory unit 30, a feeding system 35, and a RFID reader 34 with a suitably dimensioned antenna, as shown in the diagram of FIG. 3. The main intermediate units 2 have two modes of operation. In the first mode, the unit acts as a conventional RFID reader. First, it carries out a power emission lasting a few milliseconds and then it waits for the response from the object units. In this mode, the main peripheral unit may behave as an auxiliary peripheral unit in the case of communicating effectively with the object units when it is within the radio coverage area of these. The second mode of operation is based on a continuous power emission over time captured by the neighboring object units, enabling the energy storage therein by means of, for example, a capacitive device for storing energy.

Figure 4:
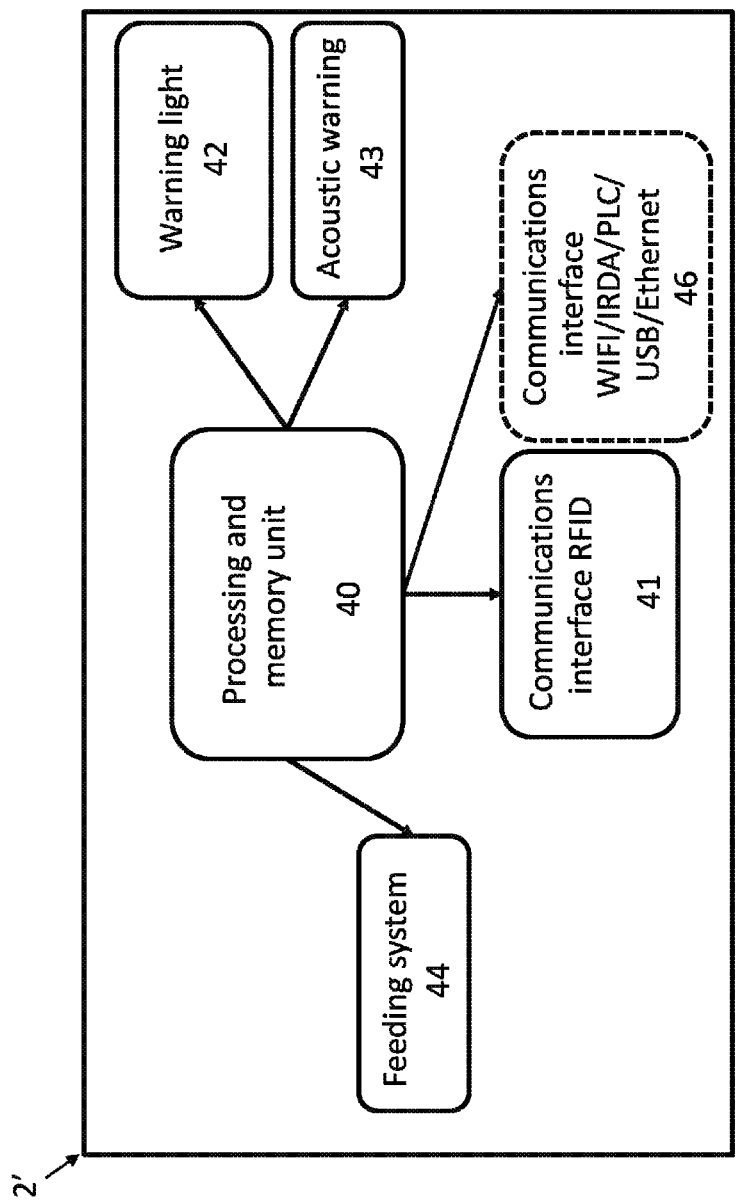
FIG. 4: Block diagram of the intermediate peripheral unit.

In the present invention, by peripheral or auxiliary intermediate unit 2' it is meant, the element of the system providing communication between the controller and object unit in case the object unit lacks enough coverage to reach the main peripheral unit 2. That is, an intermediate unit can act as a peripheral intermediate unit both, when the communication has been initiated using RFID technology and when it simply receives the response from an object unit without initiating the communication. Therefore, in the most complete implementation, the peripheral intermediate units are identical to the main ones, differing only in their behavior. However, it is convenient to position simpler peripheral intermediate units such that the cost of the system is reduced without losing effectiveness, as depicted in FIG. 4.

The peripheral intermediate units 2', in a preferred but non-exclusive embodiment, comprise a processor, 40, an active or passive RFID transponder 41, with the possibility of being equipped with a warning system for the user. The warning system may consist in an integrated small luminous device 42, as well as a sound device 43 or buzzer able to emit sound warnings. They obtain energy from the main intermediate units 2 by means of capacitive device for storing the communication RFID energy and its own auxiliary battery 44 or directly from the mains. There is no need for both, the sound 43 and luminous 42 blocks of the device, simultaneously. The peripheral intermediate units 2' may also comprise one or several of the following communication channels 46, without limitation: WIFI, IRDA, PLC, USB, Ethernet or the like.

In the present invention, by proximity unit 3 it is meant the element included in the system for the spatial location of objects and integrated in the clothing or accessories of the user in a non-intrusive way. It is responsible for the intercommunication between the main 2 or peripheral 2' intermediate unit, and the object unit 4.

Figure 5:
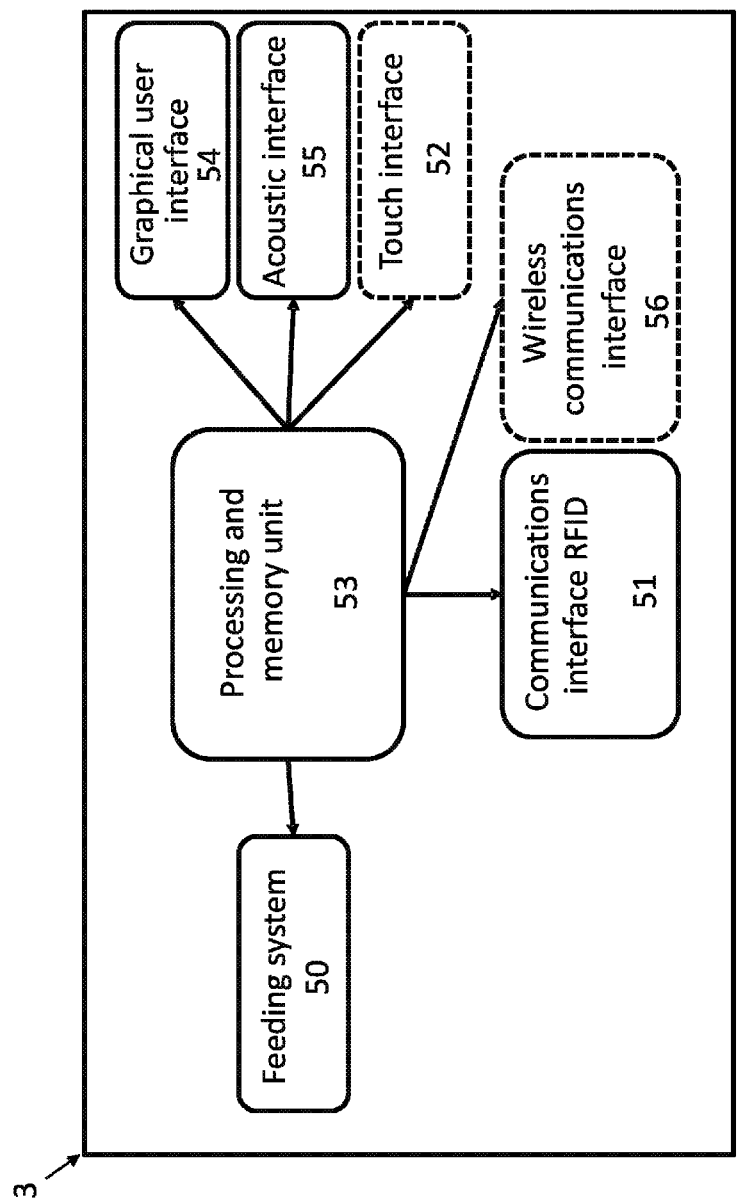
FIG. 5: Block diagram of the proximity unit.

The proximity unit 3 mainly comprises, as shown in a schematic way in FIG. 5, a RFID communication interface and it is carried by the user inside an equipment or tool of said user. Some possible examples of implementation thereof would be integrating the proximity unit into a wristwatch, a cane or a garment. If integrated into an intelligent device, such as a smart phone, then its functions would be preferably taken over by the controller unit, also present as an application on the same device. In a preferred implementation, however, it is an autonomous device which, in turn, comprises a power system 50, a tag or RFID transponder 51, a memory and a processing module 53, a device for warning the user (touch—e.g. by vibration 52—, light 54 or sound 55), and a wireless communications interface 56 (RFID, WIFI, IR, or the like, without limitation) to enable portability. So the user can be guided by the system, the proximity unit must be carried by the user during the process, such that it helps the user during the location of the object by transmitting spatial information to the user. This information is displayed by means of tone coding in a series of touch and/or light warnings and the proximity to the object sought inside the room in which it is located is transmitted dynamically and adaptively to the user. The touch warning system may be performed by means of a vibration captured by the user, a variation in the relief of a surface or part of the object and/or by means of mechanical movement of one or more parts of the object in which the proximity unit 3 is integrated. Some possible implementations of the light warning system may comprise a series of LEDs displaying the same or different colors or an LCD screen. It has dual functionality: RFID reader or tag.

In the present invention, by tag proximity unit it is meant the function of the proximity unit 3 when it acts as a RFID transponder. The proximity unit tag is the one that reflects the power received from nearby RFID readers. In this way, and as one of the key features of this invention, the user receives orders from a passive device with simple electronics as a RFID transponder, to which other elements have been added.

In the present invention, by reader proximity unit it is meant the function of said proximity unit 3 when its behavior is similar to an RFID reader, in that it carries out power emission to detect nearby RFID tags. Indeed, whenever it is close enough, the range of the object unit and the proximity unit overlap, enabling the reading of the information contained in the object unit, this informs the user about both, the degree of closeness, much more if the received power is measured, and the identity of the object to which the object unit is attached.

In the present invention, by object unit 4 it is meant the element attached to the object that you want to locate, which allows the interaction between the user and the searched object.

Figure 6:
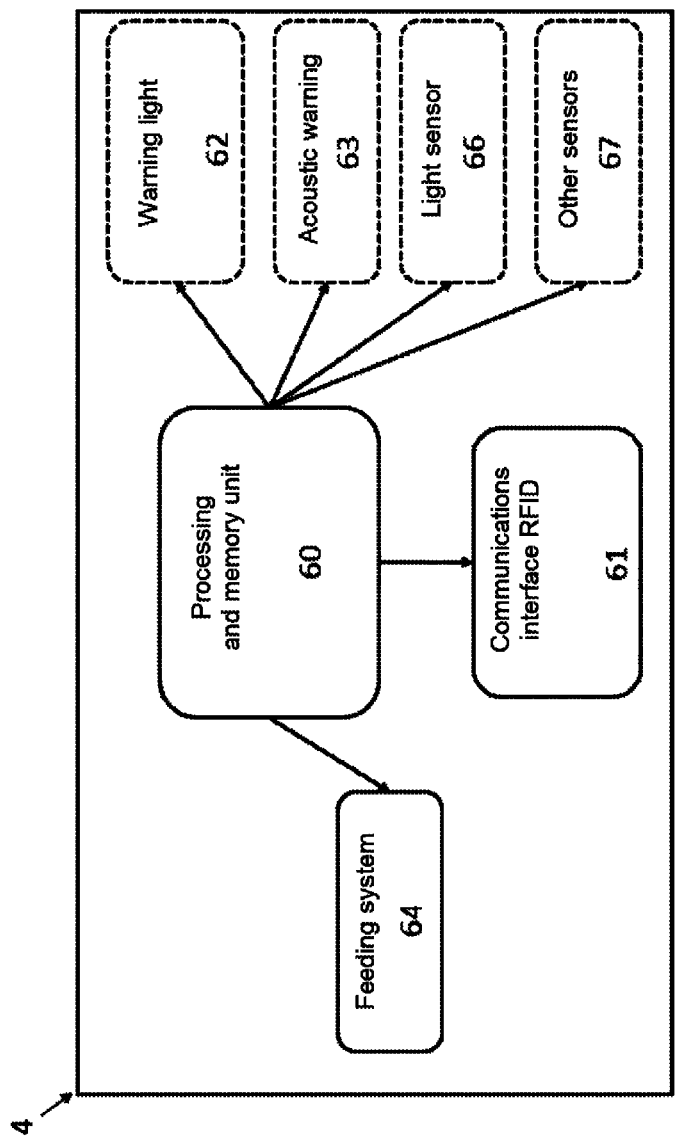
FIG. 6: Block diagram of the object unit. The blocks that are shown in dashed line are optional.

As shown in FIG. 6, the object unit 4 comprises a passive or active RFID tag 61 that captures the RFID energy and stores it in a power system 64, a processing and memory unit 60 for managing simple commands, light 62 and acoustic 63 warning devices that allow sensory location by the user, and light sensor 66 that provides further information on the environment in which it is located. The ambient light sensor 66 allows providing additional information for its location, knowing in this way if the object to be sought is covered or inside a compartment. One of the possible implementations, without limitation other implementations, would be a photovoltaic solar cell. In addition, the object unit 4 can integrate other sensors that transmit useful information for the location of the object, such as pressure, humidity or temperature sensors 67.

The warning devices can be activated when the object unit 4 and the user are close to each other or when it is out of coverage of any RFID reader, understanding by out of coverage when the radiation of the RFID reader reaches the tag but the output radiation reflected by the tag is insufficient and the reader cannot capture it. Some not limiting possible implementations of the light warning device would be the use of LEDs displaying the same or different colors, whereas the audible warning device can be formed by a buzzer. The assembly formed by all the elements is preferably encapsulated into a material, determined by the object to which it is coupled. An example of this could be a key ring-shaped 3×3 cm square plastic encapsulation with 5 mm of thickness.

The location system of the present invention has the particularity that its various components can be integrated and hidden in the domestic environment due to its size and the possibility of incorporating it easily into a decorative element. In particular, the RFID link comprised in this system is governed in a preferred embodiment in accordance with the ANS/INCITS 371 standard. By means of RFID technology and frequencies of the order of 2.45 GHz, the ranges managed by each of the readers depend on the design of the antenna, the transponder itself and the emitted power. For example, there are implementations in which the average power transmitted is 10 mW reaching ranges of 4 meters. In any case, thanks to the use of this frequency band, ranges from 2 to 20 m can be achieved, compared to the ranges in centimeters typically exhibited by RFID applications with operating frequencies in the order of hundreds of kilohertz, resulting in a significant reduction of the amount of intermediate units needed to cover a given coverage area. On the other hand, an operating frequency from 2446 MHz to 2454 MHz drastically reduces the dimensions of the RFID antennas with respect to RFID systems using frequencies in the order of kilohertz. The dimensions of an RFID transponder, including the antenna and EEPROM memory, at the operating frequency of this system is typically around 4 $mm^2$ Thanks to its small dimensions, it can be easily integrated into an object without being flashy or breaking with the aesthetics of said object. To facilitate its location by the user, the device attached to the object contains components that add additional information. One of the proposals being implemented in this invention, consists in a with 2 $mm^2$ light sensor, which allows discriminating whether the object receives light radiation or not (e.g. because it is inside a drawer or covered by another object).

RFID technology has been widely developed during recent years and the RFID link between intermediate units, proximity unit and object units in this invention fits into systems using a UHF frequency band. In particular, the band from 2446 MHz to 2454 MHz is authorized by the European regulation as a band where the maximum usable power has been increased. For example in RFID systems, the EN 300 330 standard sets an EIRP (equivalent isotropic radiated power) of up to 500 mW with a 100% duty cycle.

Unlike most of the systems based on RFID, such as those that allow locating objects in real time, the system only works when the user wants to perform a search. The controller 1 carries out a reading order, via the PLC/Wi-Fi link, from all the main intermediate units 2. These or the peripheral intermediate units 2', running in mode a) return the information detected from the tags by RFID communication. The association of the object and the number of its attached tag is carried out in a small database managed by the controller 1, where the match between the transponder serial number and the object to which it is attached, are detailed. Once the information of the required tag has been received, the controller notifies the user about the area in which the object is located.

Another use case is the location of the own user carrying a proximity unit or an object unit. The proximity unit can act as an object unit.

The match between rooms and main intermediate units is carried out by means of a database in which the main intermediate units 2 are associated with the room in which they are located, as well as the peripheral intermediate units operating in mode a). In the event that one or more readers detect the same tag, the operating protocol estimates the location, based on these data and on the known physical location of the intermediate units by some known triangulation method.

Figure 7:
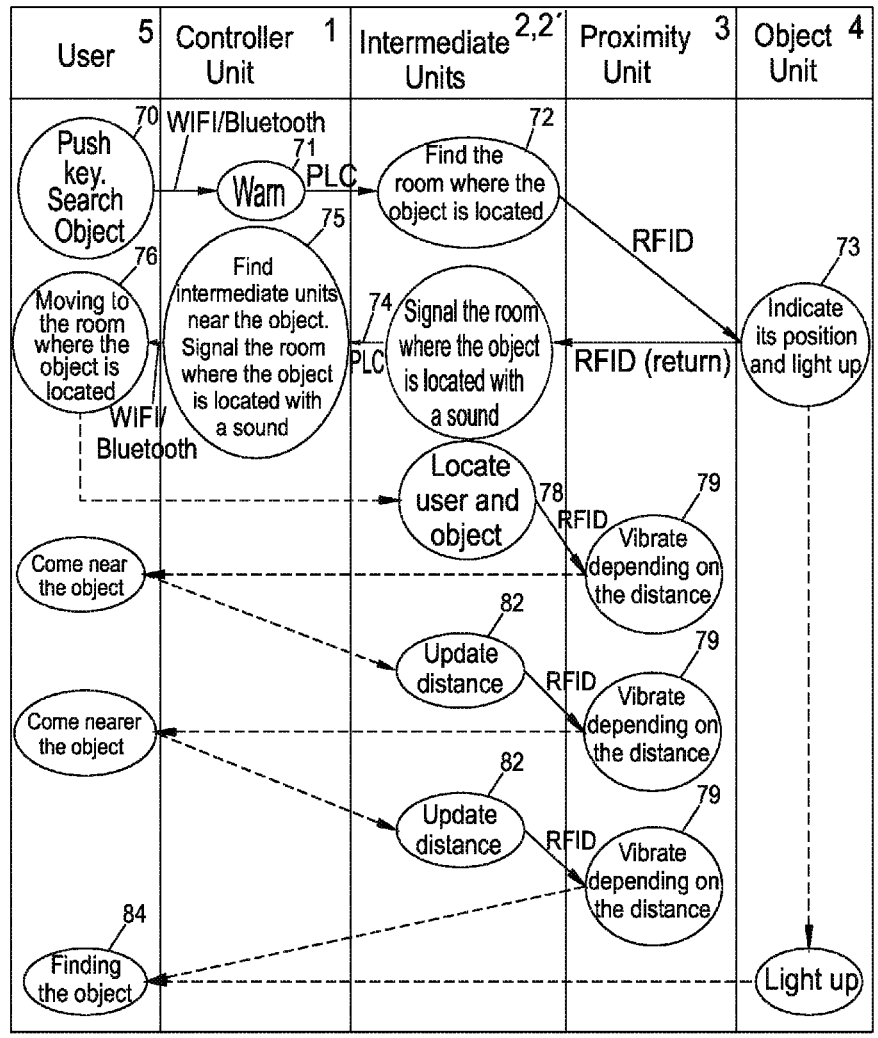
FIG. 7: Operation scheme of the system in which the proximity unit has a RFID tag function.

FIG. 7 shows, by way of example, a diagram with the implementation of the system in which the proximity unit 3 carried by the user (5) behaves as an object unit or with a tag function.

When the location of an object is required, the user can perform the search action from the controller 1. Once the user selects 70 the object to be sought, the controller 1 transmits 71 a reading order to all the main intermediate units 2. They carry out a reading 72 of the transponders that are within their range and return the information 74 to the controller 1, which compares the results of the transponders reference numbers with that corresponding to the required object according to its database. In this way, the controller 1 knows the location in accordance with the main intermediate units that have detected the object unit. This information is acoustically 75 transmitted to the user by means of a voice-over, and the user moves 76 towards that room of the house. Additionally, it can be transmitted through another voice-over if the light sensor 66 of the object unit 4 captures radiation and the object is covered or not by another element. From this moment on, the luminous device 65 of the object unit 4, if available, can be enlightened at regular time intervals to facilitate its visual location.

Once the user is in the correct room, the transponder 51 of the proximity unit 3 is located by the main intermediate units 2 of the room, which make readings at regular time intervals, for example every two seconds. With the power reading of the object unit 4, the proximity unit 3 and the peripheral intermediate units 2', the controller 1 calculates the distance between the object unit 4 and the proximity unit 3. The calculation needs the contribution of various readings by the main and peripheral intermediate units, both of the tag contained in the object unit and the tag contained in the proximity unit, including the detection of the power level received. These measurements enable the controller to determine the spatial location of both by any known triangulation method and, based on the results, to establish the distance between the two of them. The controller implements a known system of spatial location on a virtual plane of the house, from which it determines the movements to be carried out to follow a path, using a known algorithm, so the user moves closer to the object. Said information is transmitted first, to the main intermediate units 2 or directly to the proximity unit if said unit contains some long-range communication channel (WIFI, IRDA). In the case of the example, the main peripheral units retransmit it 78 to the proximity unit through the RFID link. The proximity unit 3 captures the distance information and emits a warning 79 depending on the distance, mainly in the form of vibration, although it can additionally emit warnings of other nature, such as luminous or acoustic. In this way, the users are aware of the distance between themselves and the object and they may move accordingly, when they have it practically within their reach.

Whenever the main intermediate units 2 perform a reading, the system repeats the operation determining the path to be followed according to the distance between object and user (i.e. between the object unit 4 and the proximity unit 3 carried by the user) and it is retransmitted 82 to the proximity unit 3. The users are aware of how the distance varies depending on their movements, thanks to the warning code used by the proximity unit.

Ultimately, the user finds the object 84, as the distance between the object unit and the proximity unit grows smaller; the user is able to perceive the warning light of the object unit. In the case of a blind person, only the touch warnings will be able to alert them until they physically touch it.

Figure 8:
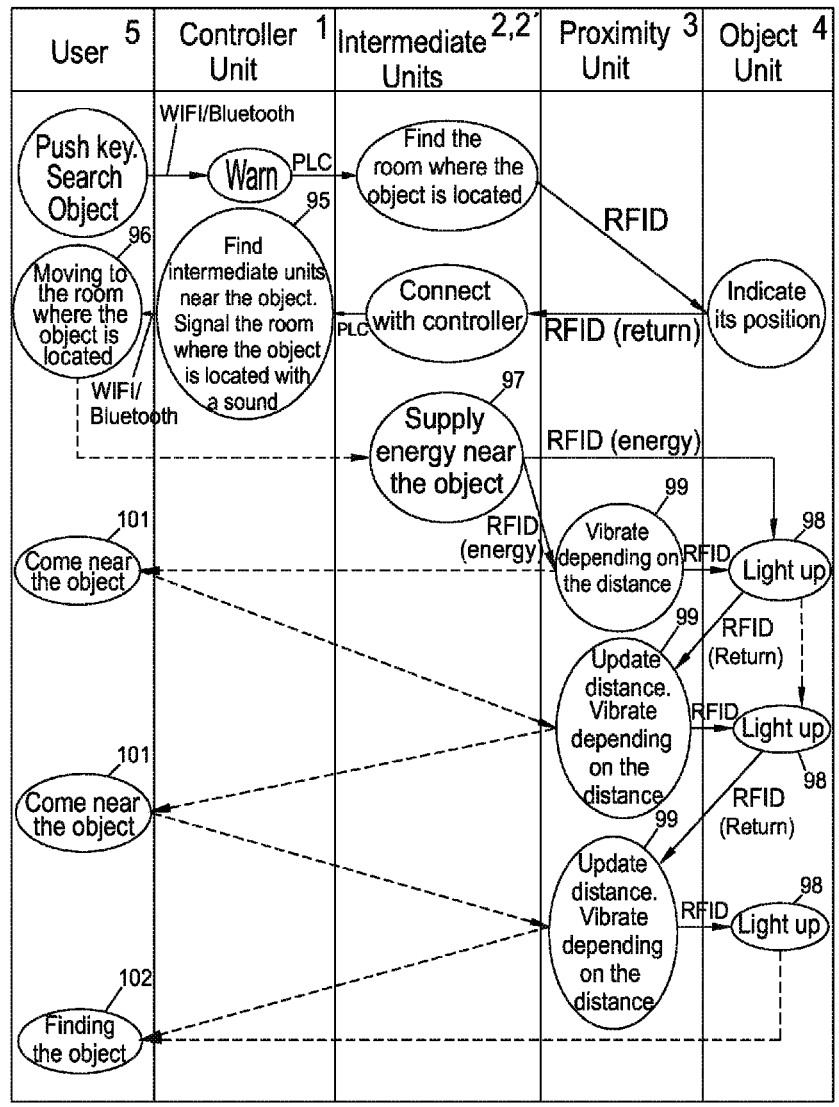
FIG. 8: Operation scheme of the system in which the proximity unit uses an RFID reader.

A further embodiment, in which the proximity unit 3 uses an integrated RFID reader 51 for locating the object unit, is shown in FIG. 8. The user carries out the search order similarly to the previous example, and the controller notifies the user 95 in which room the object is located. The user will physically move 96 to the corresponding area and once the main intermediate units 2 detect the proximity unit 3 carried by the user, they will cease making the readings in that area and will begin to radiate energy 97 steadily in their second mode of operation.

In this way, the object unit 4 receives the energy from the main intermediate units 2 and sends the location warning light 98. The proximity unit 3, with the energy supplied by the main intermediate units 2 and with the help of other energy source such as batteries, makes regular readings over time by means of the integrated RFID reader 51. With the reflected power received from the object unit 4 it calculates the distance and transmits 99 that information to the user by means of integrated warning devices (52, 54, 55). The user moves through the room, using said information, approaching 101 the object. Using the data about the distance between the object unit 4 and the proximity unit 3 and, the luminous warning and/or of a different nature warning sent by the object unit 4, the user finds 102 the object in the room.

The warning system of the proximity unit 3 is preferably tactile. It can be based on, for example a device that transmits a vibration to the user (e.g. greater vibration the closer they come to the object) or as a variation, it can have a relief that can be perceived tactilely, or the warning can be transmitted by the mechanical movement of one or more parts of the tactile warning device.

The warning system of the proximity unit 3 can also be luminous (e.g. formed by several LEDs displaying the same or different colors or a LCF display) and/or acoustic.

The object unit 4 can perform warnings sensorially detectable by the user when the object unit is not within the coverage range of an RFID reader. The object unit (4) can also have a sound-warning system (e.g. a buzzer) for notifying the user about its location.

The RFID transponders used in the various devices of the system can be active or passive.

Figure 9:
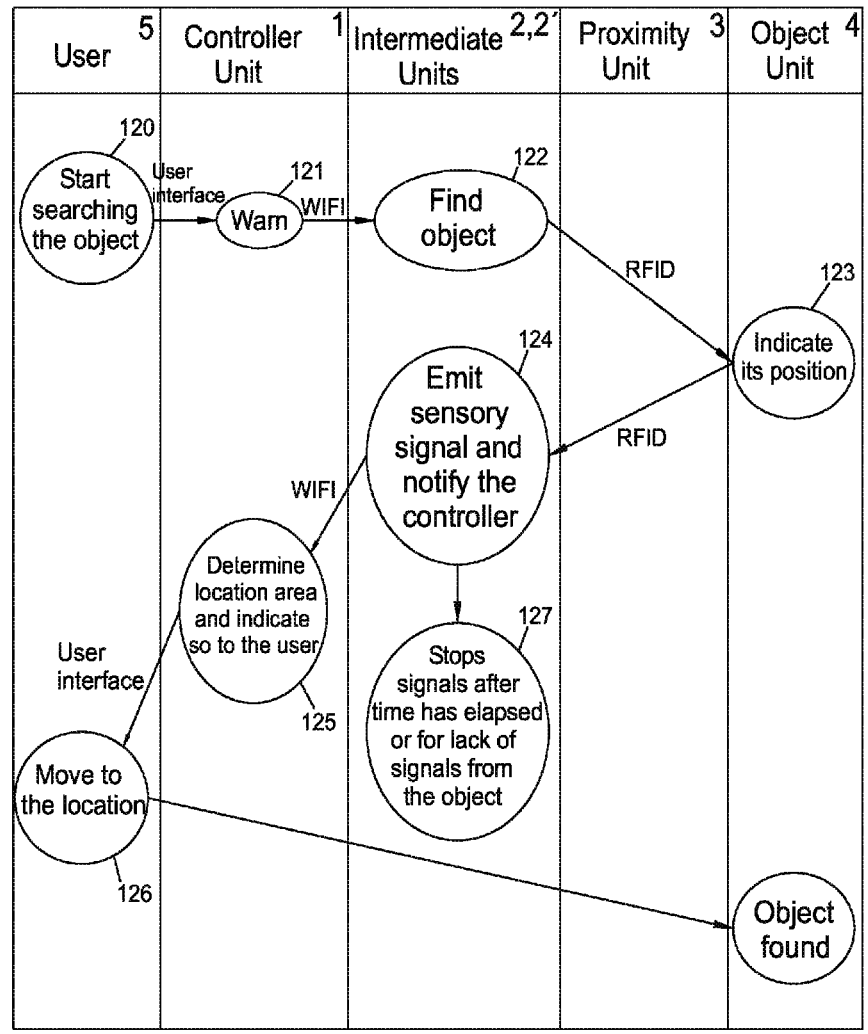
FIG. 9: Operation scheme of the system in which a proximity unit is not necessary.

A further preferred embodiment of the system defined in this invention, in which a user searches for an object by actuating on the user interface 120 formed by the graphic 21 and the touch 23 interface of the controller 1 to select the object sought, is shown in FIG. 9. The controller initiates the search 121 communicating with the main intermediate units 2 and optionally, with the peripheral 2' units, so they try to communicate with the object sought through their RFID transponders 122. The object sought replies through its RFID transponder 123, communicating its presence to the peripheral intermediate units 2'. Those units will preferably receive their energy from the main peripheral units, so they do not require any connection to the power network. When the peripheral intermediate units detect the object unit, usually only one if they have been distributed throughout the environment properly, they emit a sensory signaling, preferably luminous 124. In the event that the main intermediate units detect also the communication of the object unit, or that the peripheral intermediate units have WIFI capabilities, they shall inform the controller that the object unit has been reached, and that is why the sensory signaling has been activated. From the intermediate units that have informed, the controller will determine the room or area of location of the object unit 125, informing the user. The users will physically approach the area, and through their own sensory ability detect the peripheral intermediate unit or units that emit the sensory signaling 126. The specific location of the unit is subject to the ability of the user to distinguish the sought object from all the other objects that are in the surrounding area of the peripheral intermediate unit that is signaling. The intermediate units, either because the object unit is no longer in contact, (the user has taken it, for example) or because a time preset in the configuration of the system has elapsed, stop issuing sensory signals 127. In this embodiment, the economy of means allows eliminating a proximity unit however; this implies that the final location of the object would become more difficult for the user.

The invention claimed is:

1. A system for locating objects using radio frequency identifiers, comprising:
   at least one object unit, each attached to an object to be located by a user and having an RFID transponder;
   a proximity unit to be carried by the user, having an RFID transponder and warning means;
   wherein the system is configured to repeatedly obtain, using signal strength RFID readings, information relating to a distance between the proximity unit and the object unit, the proximity unit being configured for, once obtaining said information regarding the distance to the object to be located, alerting the user through the warning means about the distance to the object to be located;
   a plurality of main intermediate units, each one associated with a location area and comprising an RFID reader;
   a controller in communication with the main intermediate units and configured for:
      upon receiving an instruction for locating a particular object, obtaining the reading from the RFID reader of each main intermediate unit;
      determining, based on these readings, the location area of the object to be located;
      sending information to the user about said location area of the object to be located;
   a plurality of peripheral intermediate units, each one comprising an RFID transponder; and wherein the main intermediate unit associated with the location area of the object to be located is configured for:
      detecting the presence of the proximity unit carried by the user when said user is within the location area of the object to be located;
      repeatedly obtaining information relating to the distance between the proximity unit and the object unit using the captured signal strength readings coming from the RFID transponders of the peripheral intermediate units, the proximity unit and the object unit, and sending said readings to the controller in order to calculate the position and to determinate a movement suggestion; and
      repeatedly sending said information relating to the distance to the object to be located and movement suggestion to the proximity unit.

2. The system for locating objects using radio frequency identifiers according to claim 1, wherein the object unit is equipped with a luminous device and/or a sound device and is configured to activate said luminous device and/or sound device every time it receives an RFID signal directed to its RFID transponder.

3. The system for locating objects using radio frequency identifiers according to claim 1, wherein the object unit is equipped with a light sensor and is configured to communicate information from the light sensor every time the RFID transponder is questioned.

4. The system for locating objects using radio frequency identifiers according to claim 1, wherein the controller and the main intermediate units are equipped with at least one of the following communication interfaces:
   Wi-Fi;
   PLC;
   Bluetooth;
   Zigbee.

5. A system for locating objects using radio frequency identifiers, comprising:
   at least one object unit, each attached to an object to be located by a user and having an RFID transponder;
   a proximity unit to be carried by the user, having an RFID transponder and warning means;
   wherein the system is configured to repeatedly obtain, using signal strength RFID readings, information relating to the distance between the proximity unit and the object unit, the proximity unit being configured for, once obtaining said information regarding the distance to the object to be located, alerting the user through the warning means about the distance to the object to be located;
   a plurality of main intermediate units, each one associated with a location area and comprising an RFID reader;
   a controller in communication with the main intermediate units and configured for:
      upon receiving an instruction for locating a particular object, obtaining the reading from the RFID reader of each main intermediated unit;
      determining, based on these readings, the location area of the object to be located;
      sending information to the user about said location area of the object to be located;
   wherein the proximity unit further comprises an RFID reader;
   wherein the main intermediate unit associated with the location area of the object to be located is configured to detect the presence of the proximity unit carried by the user when the user is in said location area of the object to be located and to radiate energy by radio frequency to activate the RFID transponder of the object unit to be located; and wherein the proximity unit is configured to repeatedly obtain, through readings from its RFID reader of the strength of the reflected signal coming from the RFID transponder of the object unit, information relating to the distance to the object to be located.

6. The system for locating objects using radio frequency identifiers according to claim 5, wherein the object unit is equipped with a luminous device and/or a sound device and is configured to activate said luminous device and/or sound device every time it receives an RFID signal directed to its RFID transponder.

7. The system for locating objects using radio frequency identifiers according to claim 5, wherein the object unit is equipped with a light sensor and is configured to communicate information from the light sensor every time the RFID transponder is questioned.

8. The system for locating objects using radio frequency identifiers according to claim 5, wherein the controller and the main intermediate units are equipped with at least one of the following communication interfaces:
Wi-Fi;
PLC;
Bluetooth;
Zigbee.

9. A method for locating objects using radio frequency identifiers, each object to be located by a user having an object unit attached to it, equipped with an RFID transponder, and the user carrying a proximity unit with an RFID transponder and warning means, where the method comprises:
repeatedly obtaining, using RFID signal strength readings, information relating to a distance between the proximity unit and the object unit and warning the user through the warning means of the proximity unit about said distance to the object to be located;
receiving, at the controller unit, a command for locating a specific object;
obtaining, in said controller, RFID readings, from a plurality of intermediate main units, with information about the object units detected, while each main intermediate unit is associated with a location area;
determining, based on said readings, the location area of the object to be located;
sending information to the user about said location area of the object to be located;
wherein a plurality of peripheral intermediate units is used, each one comprising an RFID transponder,
wherein the step of obtaining the information relative to the distance between the proximity unit and the object unit is carried out using the signal strength readings captured by the main intermediate unit, coming from the RFID transponders of the peripheral intermediate units captured, from the proximity unit and from the object unit; and
wherein the method further comprises detecting the presence of the proximity unit carried by the user when it is within the location area of the object to be located and sending the main intermediate unit said information relating to the distance to the object to be located to the proximity unit.

10. The method for locating objects using radio frequency identifiers according to claim 9, further comprising activating a luminous device and/or a sound device of the object unit every time it receives an RFID signal directed to its RFID transponder.

11. The method for locating objects using radio frequency identifiers according to claim 9, further comprising communicating information from a light sensor of the object unit every time its RFID transponder is questioned.

12. A method for locating objects using radio frequency identifiers, each object to be located by a user having an object unit attached to it, equipped with an RFID transponder, and the user carrying a proximity unit with an RFID transponder and warning means, where the method comprises:
repeatedly obtaining, using RFID signal strength readings, information relating to a distance between the proximity unit and the object unit and warning the user through the warning means of the proximity unit about said distance to the object to be located;
receiving, at the controller unit, a command for locating a specific object;
obtaining, in said controller, RFID readings, from a plurality of intermediate main units, with information about the object units detected, while each main intermediate unit is associated with a location area;
determining, based on said readings, the location area of the object to be located;
sending information to the user about said location area of the object to be located;
wherein the proximity unit additionally comprises an RFID reader; and
wherein the step of obtaining the information relative to the distance between the proximity unit and the object unit comprises:
detecting the presence of the proximity unit carried by the user when it is within the location area of the object to be located;
emitting, the main intermediate unit associated with the location area of the object to be located, radio frequency energy to activate the RFID transponder of the object unit to be located;
repeatedly obtaining, in the proximity unit and through readings from its RFID reader on the strength of the reflected signal coming from the RFID transponder of the object unit, the information relating to the distance to the object to be located.

13. The method for locating objects using radio frequency identifiers according to claim 12, further comprising activating a luminous device and/or a sound device of the object unit every time it receives an RFID signal directed to it RFID transponder.

14. The method for locating objects using radio frequency identifiers according to claim 12, further comprising communicating information from a light sensor of the object unit every time its RFID transponder is questioned.

* * * * *